Feb. 8, 1949.　　　F. H. WHITELEY　　　2,460,864
MOTION-PICTURE PROJECTING SYSTEM
Filed Sept. 17, 1945　　　2 Sheets-Sheet 1

INVENTOR.
Fred H. Whiteley
BY
ATTORNEY

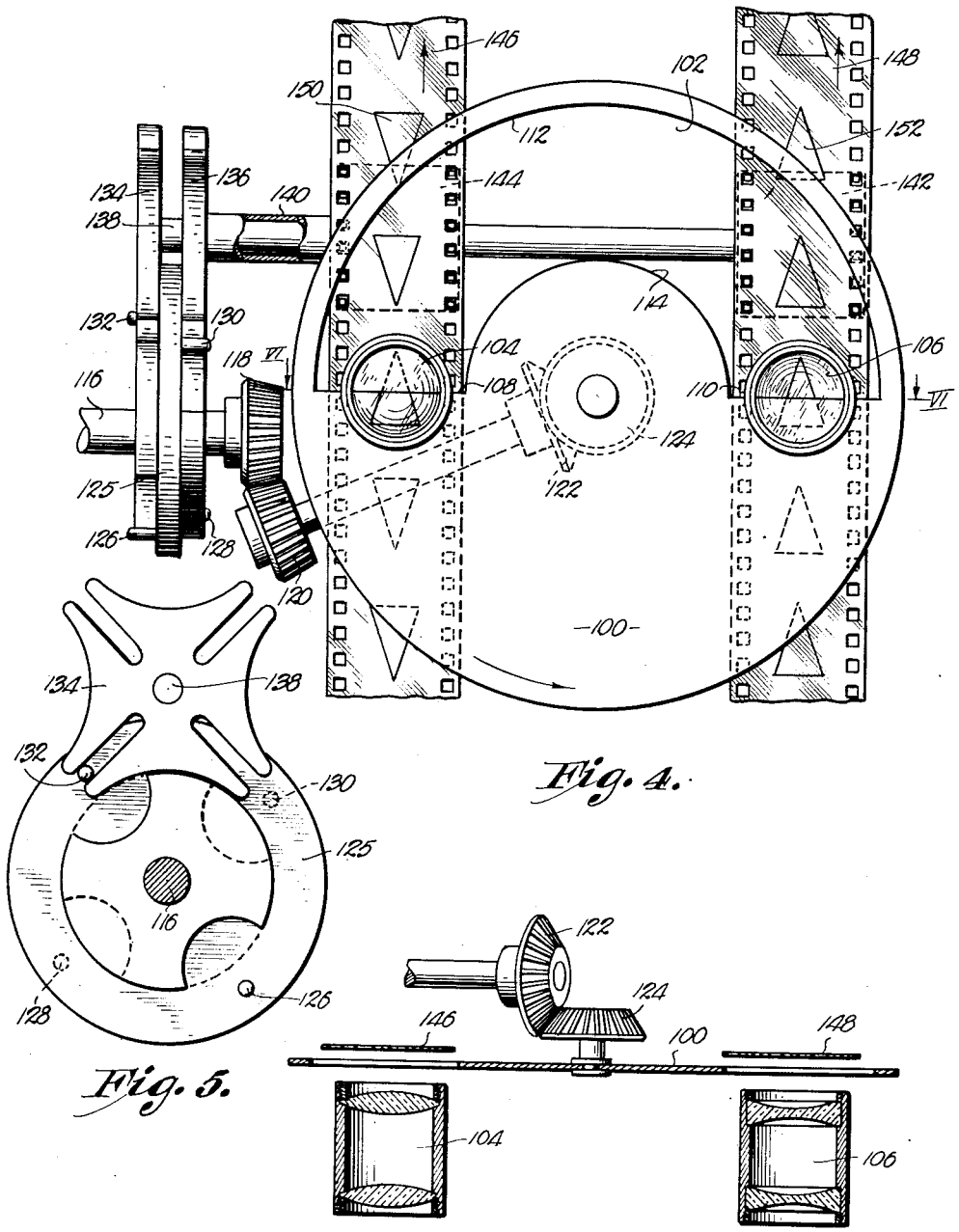

Patented Feb. 8, 1949

2,460,864

UNITED STATES PATENT OFFICE 2,460,864

MOTION-PICTURE PROJECTING SYSTEM

Fred Howard Whiteley, Kansas City, Kans.

Application September 17, 1945, Serial No. 616,678

5 Claims. (Cl. 88—16.6)

This invention relates to the art of projecting motion pictures and particularly a system and method for stereoscopic and orthographic motion picture projection capable of creating pictures that are devoid of flicker without requiring the observer to wear spectacles of special type.

The primary aim of the invention is the provision of a motion picture projecting system having uniquely arranged and designed component parts, the use whereof permits projecting stereoscopic or orthographic pictures upon a plane screen without attendant flicker.

Further aims of the invention are of an important nature and include the manner of incorporating the invention in equipment with which the motion picture film or stereoscopic or orthographic nature may be employed to obtain the desired result of presenting a smooth running, uninterrupted, and flickerless picture to the observer.

Other objects of the invention will appear during the course of the following specification, referring to the accompanying drawings, wherein:

Fig. 4 is a fragmentary front elevational view of a motion picture projector, made pursuant to a modified form of the invention.

Fig. 5 is a fragmentary side elevational view of the structure shown in Fig. 4 and illustrating a portion of the driving mechanism; and Fig. 6 is a fragmentary horizontal cross sectional view taken on line VI—VI of Fig. 4, looking in the direction of the arrows.

Figures 1, 2, 3:
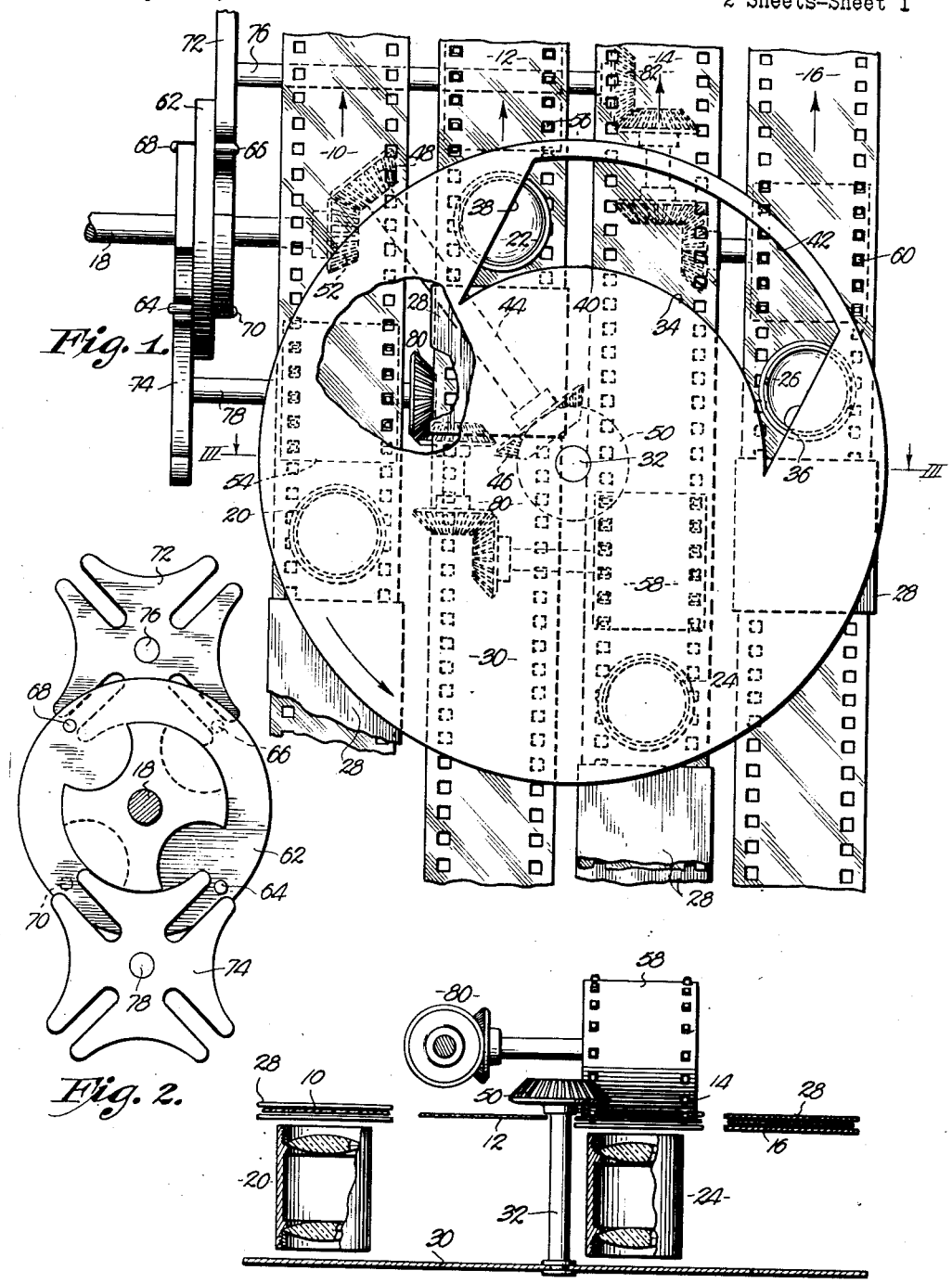
Fig. 1 is a diagrammatical view illustrating a motion picture projector made in accordance with my invention.
Fig. 2 is a fragmentary side elevational view illustrating a portion of the driving mechanism.
Fig. 3 is a fragmentary sectional view taken on line III—III of Fig. 1, looking in the direction of the arrows.

Much effort has heretofore been exerted in an attempt to obtain satisfactory flickerless screen images from stereoscopic and orthographic motion picture systems, but without satisfactory results. Complicated mechanisms have been designed but due to maladjustment and their failure to synchronize their intercepting actions, have failed in their purpose.

The projectors illustrated in the accompanying drawings are capable of creating successive images on a screen by holding in a stationary condition, the frame of the film containing the image illuminating the screen and the frame of the film containing the image that is to succeed it during a transitional period. The system also is capable of instantaneously removing a portion of the screen image as the exact corresponding portion of the image to follow fills the vacancy created by said removal in such manner that no interval of space occurs between the departing and arriving images or frame portions, while the aforementioned transition takes place.

The systems about to be described are capable of projecting a new image on the screen as the old one vanishes in such fashion as to reproduce the effect of normal observation of motion, all without flicker of any character due to failure to maintain constant and complete illumination of the projection screen.

In the form of the invention illustrated in Figs. 1, 2 and 3, four distinct strips of film 10, 12, 14 and 16 are driven from a common drive shaft 18. The four films comprise two identical sets, films 10 and 14 being a set like to the set of films 12 and 16. A lens 20 is positioned in front of film 10 and lenses 22, 24 and 26 are respectively positioned in front of films 12, 14 and 16. These films are each retained in suitable guides 28, all of which are of substantially the same form and character and serve the purpose of directing the film in its desired path of travel across the respective lenses.

Films 10, 12, 14 and 16 are disposed in a common vertical plane behind their lenses, and the specially formed shutter plate 30 is rotatably mounted on shaft 32 in front of all of said lenses. The size of shutter plate 30 is such as to cover all of lenses 20, 22, 24 and 26, and aperture 34 is so contoured as to cover a portion of one of a pair of these said lenses simultaneously as the corresponding portion of the other of the same pair is uncovered.

The ends of aperture 34 designated by the numerals 36 and 38 are parallel with each other while the sides 40 and 42 are arcuate and concentric with the axis of rotation of plate 30 and with the path wherein all of said lenses 20, 22, 24 and 26 are disposed. The length of aperture 34 or the distance between ends 36 and 38 thereof, is precisely the same as the distance between the axes of alternate lenses. In the illustrated embodiment lenses 22 and 26 are associated with aperture 34 and the said aperture is covering and uncovering corresponding portions thereof.

Shutter 30 is driven by power applied to drive shaft 18 from any suitable source not here shown. Said shaft 18 is operably joined to shaft 32 through the medium of shaft 44 and bevel gears 46 and 48 in mesh respectively with similar gears 50 and 52. Gear 50 is mounted on shaft 32 and gear 52 is secured to drive shaft 18.

Each film 10, 12, 14 and 16 has a driving sprocket 54, 56, 58 and 60 respectively, each rotated to move their respective films in the direction of the arrows shown in Fig. 1. Shaft 18 has a Geneva gear assembly comprising the driven member 62 having pins 64, 66, 68 and 70 extending laterally therefrom and to each side thereof. The Geneva stop gears 72 and 74 operatively engage pins 66 and 70 and pins 68 and 64 respectively.

Gear 72 is mounted on driven shaft 76 while gear 74 is mounted on driven shaft 78. Shaft 78 supports sprocket 54 and sprocket 58 is driven simultaneously with sprocket 54 through the medium of a gear train, generally designated by the numeral 80 and comprising four bevel gears and their interconnecting shafts as clearly revealed in Fig. 1. Sprockets 56 and 60 are simultaneously driven to direct films 12 and 16 past their respective lenses because of the connection with driven shaft 76. Shaft 76 is directly connected to sprocket 56 and a train of gears broadly designated 82 forms a medium of interconnection between sprockets 56 and 60.

In the form of the invention illustrated in Figs. 4, 5 and 6, but two picture films are employed with mechanism including shutter 100 having aperture 102 therein of a form clearly shown in Fig. 4. Aperture 102 is of a fixed length to correspond to the distance between the centers of lens systems 104 and 106. The ends 108 and 110 of aperture 102 are radial and in alignment while the sides 112 and 114 of aperture 102, are concentric and a distance apart sufficient to present a clear opening for the passage of rays directly through either of lens systems 104 and 106 as aperture 102 passes the axes thereof.

Shutter 100 is driven by drive shaft 116 through the medium of gears 118, 120, 122 and 124. Geneva driving gear 125 mounted on shaft 116 has pins 126, 128, 130 and 132, in mesh with stop gears 134 and 136 operatively associated with shaft 138 and tubular shaft 140 respectively. Shaft 138 extends to sprocket 142 to drive the same and shaft 140 connects with sprocket 144—all for the purpose of intermittently driving films 146 and 148 in the direction of the arrows shown in Fig. 4.

Images 150 are on picture film 146 and images 152 are on picture film 148. The films 146 and 148 are exposed through the use of dual lens camera, one lens system whereof is reversed in the manner illustrated in Fig. 6. In other words, the images of one film in the camera are completely reversed top to bottom and side to side from the position of the images in the companion film.

Assuming that the film 148 has images 152 of normal position, it will be apparent that images 150 of film 146 are reversed—thus, when the pictures are being projected, the films 146 and 148 may be caused to travel in the direction of the arrows to attain the objects of the invention and to produce the results identical to those obtainable when using the form of the invention illustrated in Figs. 1 to 3 inclusive.

It is clear that in order to attain the objects of this invention, particularly as to elimination of flicker, it is necessary to reverse images 150. Thus, as illustrated in Fig. 4, the upper half of image 152 is being projected as the lower half of image 150 is projected, to present a full image on the screen.

Operation

Reverting now to the motion picture projecting system made in accordance with the preferred form of the invention, illustrated schematically and in a more or less diagrammatical way, in Figs. 1, 2 and 3.

Shutter 30 is constantly rotated by drive shaft 18 and the parts transmitting motion to shaft 32, and in the condition illustrated in Fig. 1, aperture 34 is revealing one-half of lens 22 and one-half of lens 26 through which pictures on adjacent frames of films 12 and 16 are being projected. Films 12 and 16 are those produced through the employment of a well-known dual lens camera for purpose of creating stereoscopic effects. The frame behind lens 22 carries a picture that was taken simultaneously with that in the frame behind lens 26. Due to the position of lenses 22 and 26 therefore, offsetting of films 12 and 16 to insure this relation of parts, must be done when the projector is threaded.

As the covered portion of lens 22 is uncovered through the movement of shutter 30, the uncovered portion of lens 26 is progressively covered. Thus, a "peeling" of the projected picture occurs and the projection screen is constantly and completely illuminated. No time interval can possibly occur due to the formation of aperture 34 and its relation to lenses 22 and 26 on the one hand, and lenses 20 and 24 on the other hand.

It is important to maintain edges 36 and 38 in parallelism and at a distance apart equal to the distance between the axes of adjacent projecting lenses 20, 22, 24 and 26 as computed on arc extending through the center of these lenses. The linear direction of travel of the intercepting action of these said edges are identical. In this connection referring to Figs. 4 to 6 inclusive, note that lens system 104 reverses the image and therefore, the intercepting action of edges 108 and 110 are in the same direction.

At this juncture it is notable that ends 36 and 38 of aperture 34 are in parallelism and that the same portions of the image of the frames behind lenses 22 and 26 are simultaneously uncovered and covered respectively.

Films 12 and 16 are stationary while aperture 34 moves before lenses 22 and 26 and completely past both of said lenses. During the time aperture 34 was passing lenses 22 and 26 behind which are disposed films 12 and 16, films 10 and 14 were being advanced two frames by stop gear 74 and driving member 62 and its pins 64 and 68. As aperture 34 moves to open lens 20 and progresses to open lens 24, films 10 and 14 are stationary. As soon as lens 22 is left by end 36 of aperture 34 films 12 and 16 are advanced in the direction of the arrows by stop gear 72, member 62 and its pins 66 and 70.

The frame of film 10 which is behind lens 20 as end 36 moved across lens 22, is the next succeeding frame in the sequence of exposures from that behind lens 20 when aperture 34 is moving to allow projection of the images from said frames onto the screen.

Films 10 and 14 are stationary while aperture 34 moves before lenses 20 and 24 and completely past both of said lenses. During the time aperture 34 was passing lenses 20 and 24 behind which are disposed films 10 and 14, films 12 and 16 were being advanced two frames by the aforementioned Geneva gearing arrangement including member 66, stop gear 72 and the pins on driving member 62. As soon as end 36 of aperture 34 leaves lens 24, films 10 and 14 are advanced two frames. From this point on the cycle of operation is repeated to insure like operation until the film is run.

If it is desired to double the frequency at which companionate frames are projected upon the screen with respect to the frequency with which successive frames of film are projected on the screen, it is only necessary to adjust the gear ratios so that sprockets 54 and 58 and sprockets 56 and 60 move one frame with each movement of shafts 76 and 78 respectively instead of two frames as formerly described.

If it is desired to reduce the frequency at which companionate film frames are projected or compared to the frequency at which successive film frame are projected such may be done by threading the two sets of films so that companionate films are adjacent to each other, i. e., films 10 and 12 are identical with each other but companionate to film 14 and 16 which are in turn identical with each other. The films are threaded so that frame 1 lies behind lens 20, succeeding frame 2 of identical film 12 lies behind lens 22, succeeding frame 3 of film 14 (companionate to films 10 and 12) lies behind lens 26, and the succeeding 4 of films 16 lies behind lens 24. Sprockets 54 and 56 are then geared to move in unison and to move films 10 and 12 four frames forward with each intermittent motion. Sprocket wheels 58 and 60 are constructed likewise with respect to films 14 and 16. It will be observed that with this arrangement, the frequency of change between companionate films will occur at one-half the frequency that occurs between succeeding frames.

It is realized that the provision of four films and advancing the same two frames at a time presents some waste film. However, this method eliminates the necessity of a special printing process of removing alternate frames of one pair of the films and opposite alternate frames on the other pair of films. There is always a likelihood of damage to the films during such process and spacing the frames in perfect co-ordination with the marginal driving perforations thereof is extremely difficult. Furthermore, slower film speed is made possible than the form shown in Figs. 4 to 6 inclusive, and the necessity of different types of lenses as at 104 and 106 of the latter is obviated. The use of two lenses makes it difficult to obtain identical results, particularly with respect to light intensity, otherwise this latter form is advantageous due to saving in film.

The operation of structure illustrated in Figs. 4, 5 and 6 is such as to insure constant and complete illumination of the projection screen as was the case with the form illustrated in Figs. 1, 2 and 3.

In the position illustrated in Fig. 4, the upper half of lens system 106 and the upper half of lens system 104 is projecting the upper half of image 152 and the lower half of image 150 respectively from the adjacent frames onto the projection screen. Due to the reversing nature of lens system 104, the image 150 behind lenses 104, is reversed for projection. Images 150 and 152, therefore, will be normal to each other after leaving their respective lens systems 104 and 106, and the said images are so illustrated at the lenses in Fig. 4. Otherwise, if the lenses 104 and 106 were identical, the upper half of images 150 and 152 would be superimposed on the screen when disc 100 is in the position shown in Fig. 4.

Films 146 and 148 are stationary and, due to the timing of Geneva gearing at driving member 120, film 146 will be moved one frame in the direction of the arrow after edge 110 of aperture 102 passes lens 106. Film 148, however, remains stationary during the time that aperture 102 is traversing lens 104. By the time edge 108 of aperture 102 reaches lens 106, the next succeeding frame has been moved to position behind lens 106 and the projected picture on the screen is comprised of the lower half of the frames behind lenses 104 and 106. This because of the reversing lens system 104 and the reversed position of film 146.

In the condition of the apparatus illustrated in Fig. 4, the upper half of the frame of film 148 underlying lens 106 is being projected but the lower half of the frame of film 146 underlying lens 104 is being projected for the same reasons as above set forth.

After shutter 100 moves its aperture 102 past lens 104, actuating mechanism for film 146 will advance said film in the direction of the arrow, one frame. Thus, the films are intermittently advanced to present related and successive frames alternately to create the "peeling" action and stereoscopic effect so desirable in motion picture projection systems of this type.

In the event it is desired to use conventional film in the projector shown in Fig. 4, for the purpose of eliminating flicker, said conventional film is threaded the same as illustrated, but the gearing is arranged to feed the film in opposite directions through an intermittent motion and timing that will advance the respective films two frames in lieu of one.

The versatility of the system above described and illustrated is obvious to one skilled in the art, and since the embodiment of the broad ideas has been schematically illustrated, it is clear that alterations may be made without departing from the spirit of the invention. Physical characteristics of the projecting system will be different from those illustrated because of commercial operative requirements, but the objects are fulfilled through use of the two forms of projectors illustrated.

Having thus described the invention, what is claimed as new and desired to be secured by Letters Patent is:

1. In a motion picture projecting system of the character described, a plurality of independent picture films arranged in pairs, the films of each pair having been simultaneously made of the same subject, said films being divided into frames and arranged in side-by-side relation with stretches thereof in a common plane; a projecting lens to one side of each film respectively; mechanism for applying step-by-step movement to the films to draw the same past their respective lenses; a single rotatable opaque shutter plate, having an aperture formed therethrough, mounted in front of the lenses and of a size great enough to intercept light passing through all of said lenses, said films of each pair being offset one frame, the aperture of the shutter being formed to progressively cover the lens of one film of a pair of films as the lens of the other film of the pair is uncovered, said covering action of the shutter being such as to intercept and uncover respectively, like portions of the images being projected from the frames behind the lenses of the pairs of films.

2. In a motion picture projecting system of the character described, a plurality of pairs of independent but like picture films divided into frames and arranged in side-by-side relation with like stretches thereof in a substantially common vertical plane; a projecting lens to one side of each film stretch respectively, to register with the individual frames of the films, the lenses for the stretches of each pair of films being vertically offset to register with successive frames of the pair of films whereby when one lens is projecting an image from one frame of one film of one pair of films, the other lens is in register with next succeeding frame of the other film of the said pair of films; a single rotatable opaque shutter plate having an aperture formed therethrough, mounted in front of the lenses and of a size great enough to intercept light passing through all of the lenses; means for imparting step-by-step movement to the films; and means for constantly rotating the shutter, said aperture being formed with parallel edges a distance apart equal to the distance between the axes of the lenses on an arc having a radius equal to the distance between the axis of rotation of the shutter and the axes of said lenses.

3. In a motion picture projecting system of the character described, a plurality of pairs of independent but like picture films divided into frames and arranged in side-by-side relation with like stretches thereof in a substantially common vertical plane; a projecting lens to one side of each film stretch respectively, to register with the individual frames of the films, the lenses for the stretches of each pair of films being vertically offset to register with successive frames of the pair of films whereby when one lens is projecting an image from one frame of one film of one pair of films, the other lens is in register with next succeeding frame of the other film of the said pair of films; a single rotatable opaque shutter plate having an aperture formed therethrough, mounted in front of the lenses and of a size great enough to intercept light passing through all of the lenses; means for imparting step-by-step movement to the films; and means for constantly rotating the shutter, said aperture being formed with parallel edges a distance apart equal to the distance between the axes of the lenses on an arc having a radius equal to the distance between the axis of rotation of the shutter and the axes of said lenses, said means for imparting step-by-step movement to the films being adapted to hold the films stationary so long as any part of the lenses for the pair of films are capable of projecting images through the aperture of the shutter.

4. In a motion picture projecting system of the character described, a plurality of pairs of independent but like picture films divided into frames and arranged in side-by-side relation with like stretches thereof in a substantially common vertical plane; a projecting lens to one side of each film stretch respectively, to register with the individual frames of the films, the lenses for the stretches of each pair of films being vertically offset to register with succesive frames of the pair of films whereby when one lens is projecting an image from one frame of one film of one pair of films, the other lens is in register with the next succeeding frame of the other film of the said pair of films; a single rotatable opaque shutter plate having an aperture formed therethrough, mounted in front of the lenses and of a size great enough to intercept light passing through all of the lenses; means for imparting step-by-step movement to the films; and means for constantly rotating the shutter, said aperture being formed with parallel edges a distance apart equal to the distance between the axes of the lenses on an arc having a radius equal to the distance between the axis of rotation of the shutter and the axes of said lenses, the linear direction of travel of the parallel edges of the shutter forming the opening in the shutter being identical as the edges pass across the said lenses respectively.

5. In a motion picture projecting system of the character described, a plurality of pairs of independent but like picture films divided into frames and arranged in side-by-side relation with like stretches thereof in a substantially common vertical plane; a projecting lens to one side of each film stretch respectively, to register with the individual frames of the films, the lenses for the stretches of each pair of films being vertically offset to register with successive frames of the pair of films whereby when one lens is projecting an image from one frame of one film of one pair of films, the other lens is in register with the next succeeding frame of the other film of the said pair of films; a single rotatable opaque shutter plate having an aperture formed therethrough, mounted in front of the lenses and of a size great enough to intercept light passing through all of the lenses; means for imparting step-by-step movement to the films; and means for constantly rotating the shutter, said aperture being formed with parallel edges a distance apart equal to the distance between the axes of the lenses on an arc having a radius equal to the distance between the axis of rotation of the shutter and the axes of said lenses, said means for imparting step-by-step movement to the films being adapted to hold the films stationary so long as any part of the lenses for the pair of films are capable of projecting images through the aperture of the shutter, the linear direction of travel of the parallel edges of the shutter forming the opening in the shutter being identical as the edges pass across the said lenses respectively, the said means for imparting step-by-step movement to the films being designed to move the films when the lenses are covered by the shutter.

FRED HOWARD WHITELEY.

REFERENCES CITED

The following references are of record in the file of this patent:

UNITED STATES PATENTS

| Number | Name | Date |
|---|---|---|
| 904,212 | Moran | Nov. 17, 1908 |
| 986,163 | Giordano | Mar. 7, 1911 |
| 1,247,646 | Craig | Nov. 27, 1917 |
| 1,259,365 | Cooper | Mar. 12, 1918 |

FOREIGN PATENTS

| Number | Country | Date |
|---|---|---|
| 414,924 | France | July 1, 1910 |